(12) United States Patent
Ma et al.

(10) Patent No.: US 6,710,828 B2
(45) Date of Patent: Mar. 23, 2004

(54) LIQUID CRYSTAL DISPLAY WITH DETACHABLE BASE

(75) Inventors: Chih-Peng Ma, Taipei (TW); Yu-Hsin Chuo, Taipei (TW); Chung-Cheng Hua, Taipei (TW)

(73) Assignee: Compal Electronics, Inc., Taipei (TW)

( * ) Notice: Subject to any disclaimer, the term of this patent is extended or adjusted under 35 U.S.C. 154(b) by 173 days.

(21) Appl. No.: 09/986,352

(22) Filed: Nov. 8, 2001

(65) Prior Publication Data

US 2003/0086028 A1 May 8, 2003

(51) Int. Cl.$^7$ ............................................. G02F 1/1333
(52) U.S. Cl. .......................... 349/58; 349/60; 369/681; 369/682; 439/536
(58) Field of Search ...................... 349/58–60; 369/681, 369/682; 439/536

(56) References Cited

U.S. PATENT DOCUMENTS

| 4,846,536 A | * | 7/1989 | Saitou et al. ............... 361/682 |
| 5,715,137 A | * | 2/1998 | Choi ........................... 361/681 |
| 5,867,148 A | * | 2/1999 | Kamimaki et al. ......... 345/169 |
| 5,870,281 A | * | 2/1999 | Kim ........................... 361/681 |
| 6,050,849 A | * | 4/2000 | Chang ........................ 439/536 |
| 6,268,998 B1 | * | 7/2001 | Cho ........................... 361/681 |

* cited by examiner

Primary Examiner—Julie-Huyen L. Ngo
(74) Attorney, Agent, or Firm—Foley & Lardner

(57) ABSTRACT

A liquid crystal display includes a supporting portion having a connecting end connected non-removably to a liquid crystal display panel, and an engaging end opposite to the connecting end, a base connected detachably to the engaging end of the supporting portion, and an engaging unit disposed on the engaging end of the supporting portion and the base for providing a releasable engagement between the supporting portion and the base.

7 Claims, 7 Drawing Sheets

LIQUID CRYSTAL DISPLAY WITH DETACHABLE BASE

BACKGROUND OF THE INVENTION

1. Field of the Invention

The invention relates to a liquid crystal display, more particularly to a liquid crystal display with a detachable base.

2. Description of the Related Art

FIG. 1 illustrates a conventional liquid crystal display 2. The conventional liquid crystal display 2 includes a base 23 disposed on a plane (not shown), a supporting portion 22 having a lower end connected integrally to the base 23, and an upper end opposite to the lower end, and a liquid crystal display panel 21 connected pivotally to the upper end of the supporting portion 22 such that the liquid crystal display panel 21 can be rotated relative to the supporting portion 22 within a limited angular range. However, due to the adjustable viewing angle, the distance between front and rear ends of the base 23 must be at least four times the thickness of the liquid crystal display panel 21 for ensuring stability of the conventional liquid crystal display 2 when adjusting the liquid crystal display panel 21. Because the base 23 is not designed to be detachable from the supporting portion 22, the conventional liquid crystal display 2 has a relatively large packaging size requirement (indicated by dotted lines in FIG. 1), thereby resulting in higher costs.

SUMMARY OF THE INVENTION

Therefore, the object of the present invention is to provide a liquid crystal display with a detachable base to result in a smaller packaging size requirement.

According to the present invention, a liquid crystal display comprises:

a liquid crystal display panel;

a supporting portion having a connecting end connected non-removably to the liquid crystal display panel, and an engaging end opposite to the connecting end;

a base connected detachably to the engaging end of the supporting portion; and an engaging unit disposed on the engaging end of the supporting portion and the base for providing a releasable engagement between the supporting portion and the base.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
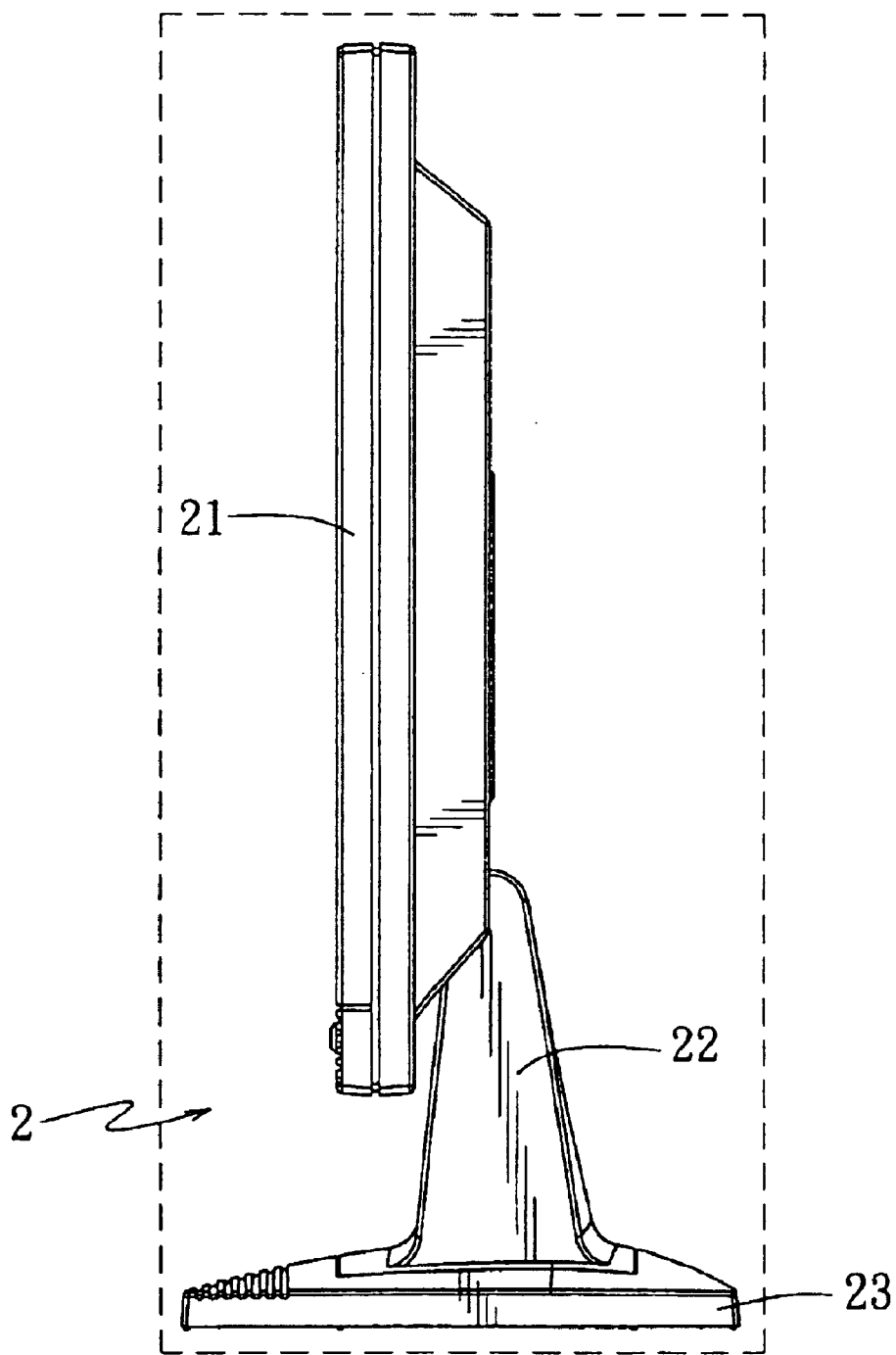
FIG. 1 is a schematic side view of a conventional liquid crystal display.

Before the present invention is described in greater detail, it should be noted that like elements are denoted by the same reference numerals throughout the disclosure.

Figure 2:
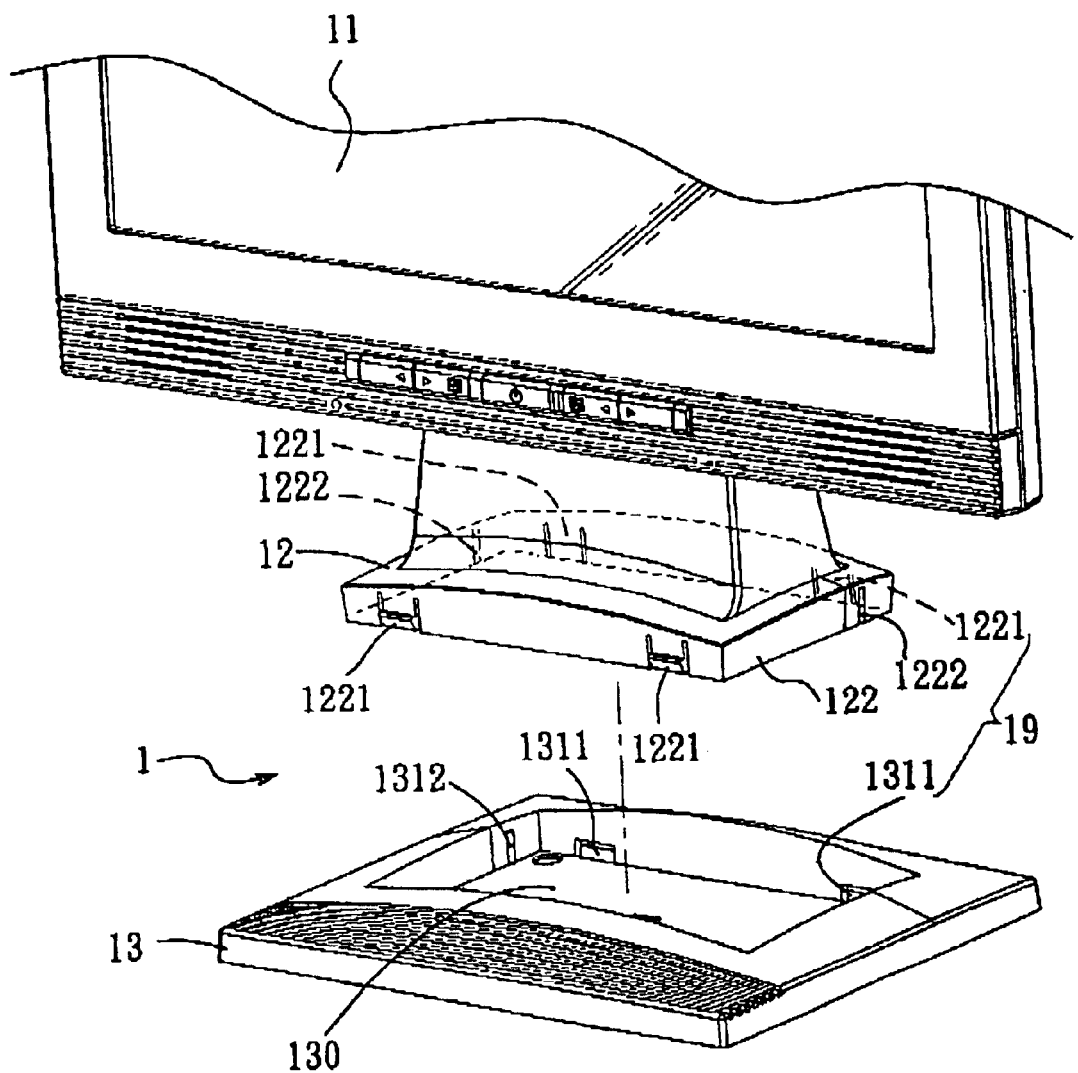
FIG. 2 is an exploded fragmentary perspective view showing the first preferred embodiment of a liquid crystal display according to this invention.
Figure 4:
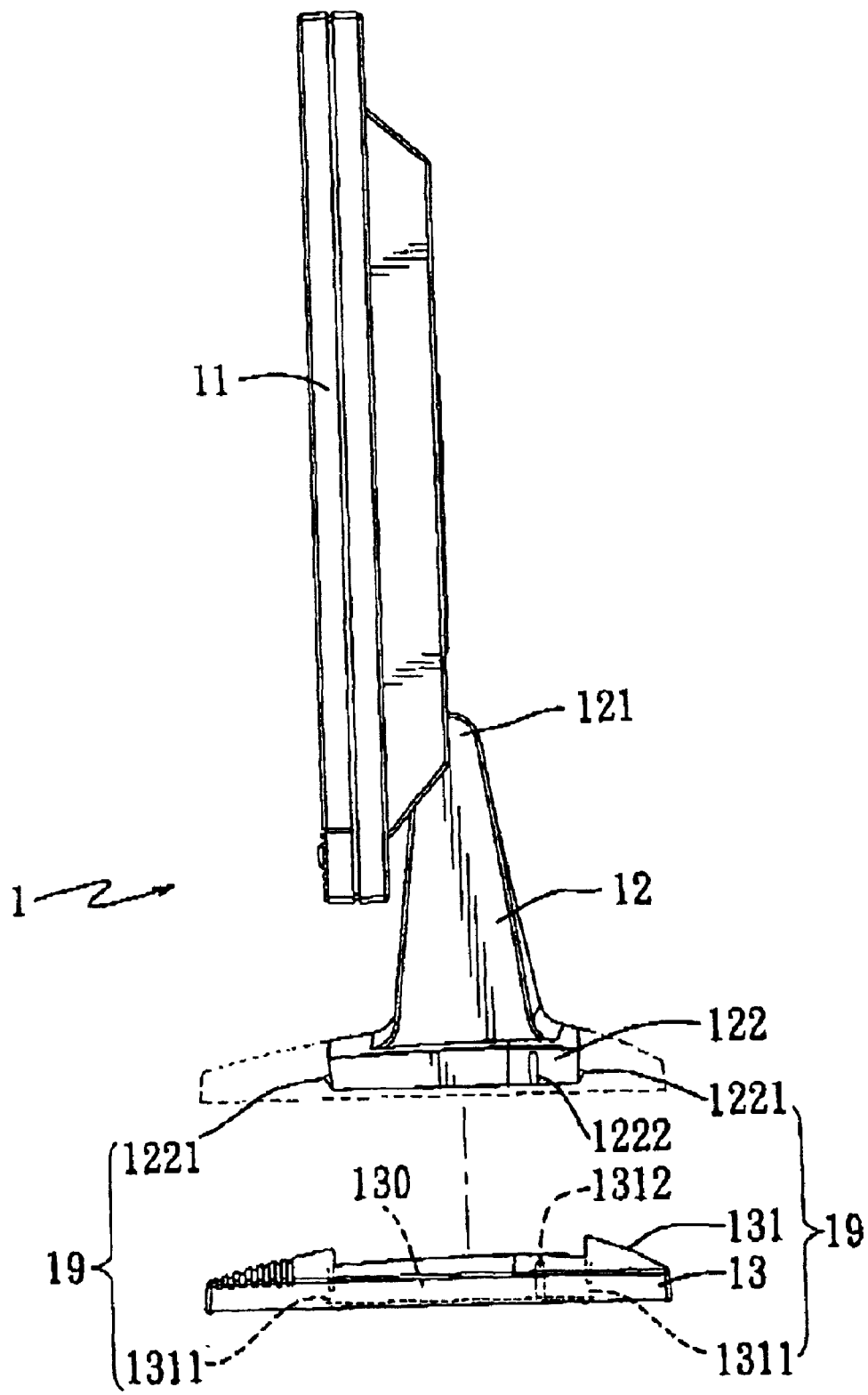
FIG. 4 is an exploded, schematic side view showing the first preferred embodiment.

Referring to FIGS. 2 and 4, according to the preferred embodiment of this invention, a liquid crystal display 1 is shown to include a liquid crystal display panel 11, a supporting portion 12, a base 13, and an engaging unit 19.

The liquid crystal display panel 11 is used for displaying images, such as text or pictures.

The supporting portion 12 has a connecting end 121 connected non-removably to the liquid crystal display panel 11, and an engaging end 122 opposite to the connecting end 121. The connecting end 121 is connected pivotally to the liquid display panel 11 in a conventional manner such that the liquid crystal display panel 11 can be rotated relative to the supporting portion 12 within a limited angular range. The engaging end 122 is formed into a rectangular.

The base 13 is connected detachably to the engaging end 122 of the supporting portion 12. The base 13 has a top surface 131 formed with a rectangular receiving recess 130 for receiving the engaging end 122 of the supporting portion 12.

The engaging unit 19 is disposed on the engaging end 122 of the supporting portion 12 and the base 13 for providing a releasable engagement between the supporting portion 12 and the base 13. In this embodiment, the engaging unit 19 includes four resilient engaging lugs 1221 formed on the engaging end 122 of the supporting portion 12, and four engaging holes 1311 formed in the receiving recess 130 of the base 13. Each of the engaging lugs 1221 is capable of engaging a respective one of the engaging holes 1311 when the engaging end 122 of the supporting portion 12 is disposed in the receiving recess 130 of the base 13.

The liquid crystal display 1 further includes a positioning unit disposed on the engaging end 122 of the supporting portion 12 and the base 13 for positioning the engaging end 122 in the receiving recess 130. In this embodiment, the positioning unit includes two vertically extending positioning grooves 1222 formed in the engaging end 122 of the supporting portion 12, and two vertically extending positioning ribs 1312 formed in the receiving recess 130. Each of the positioning ribs 1312 is capable of engaging a respective one of the positioning grooves 1222 when the engaging end 122 of the supporting portion 12 is disposed in the receiving recess 130 of the base 13.

Figure 6:
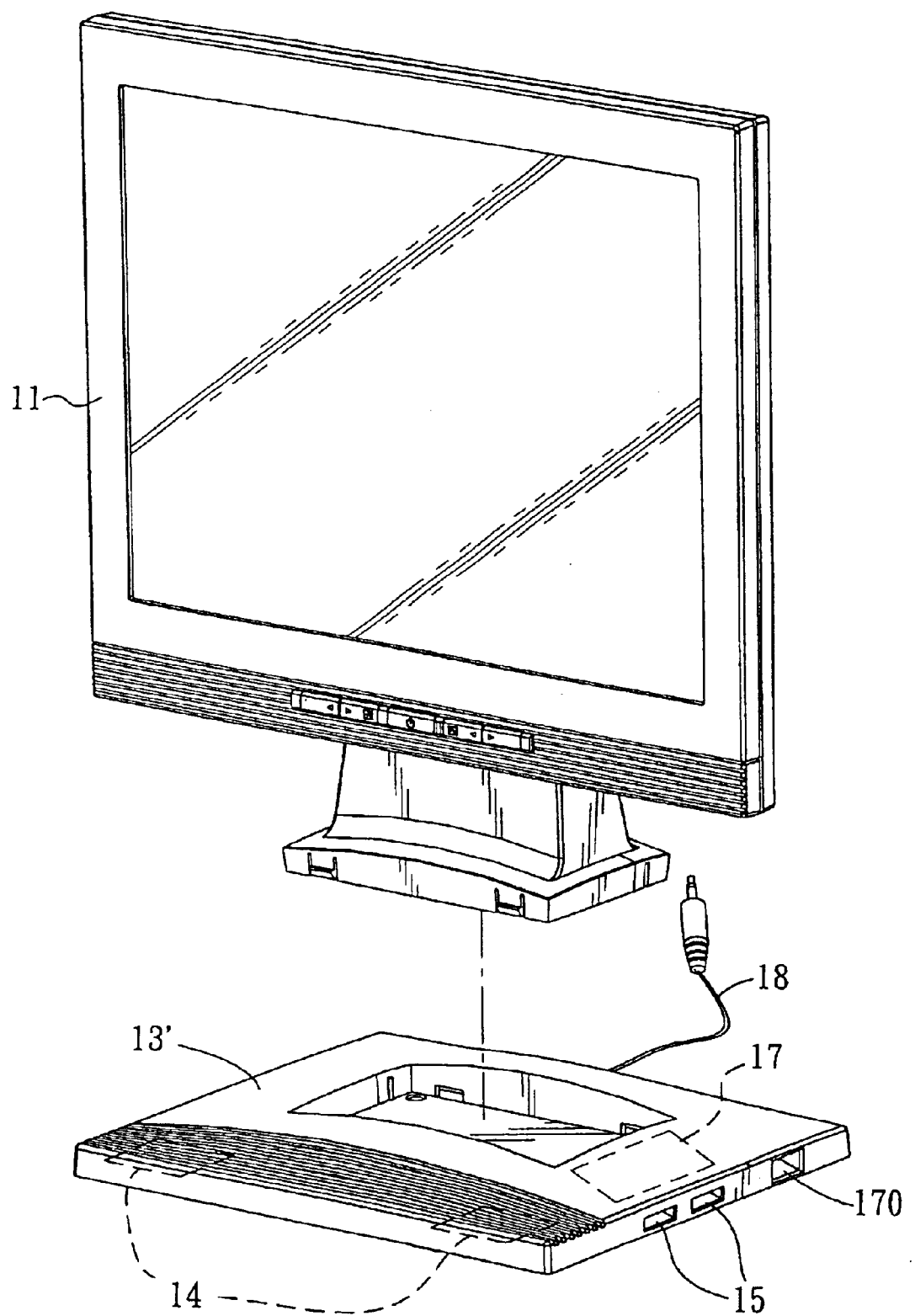
FIG. 6 is an exploded perspective view showing the second preferred embodiment of a liquid crystal display according to this invention.
Figure 7:
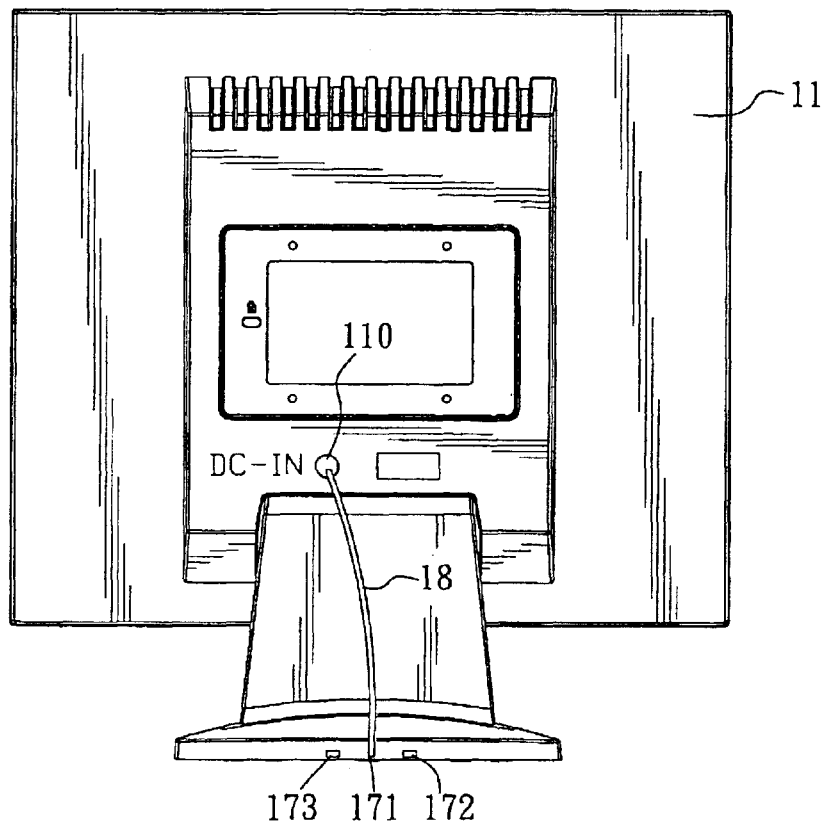
FIG. 7 is a schematic rear view showing the second preferred embodiment.
Figure 8:
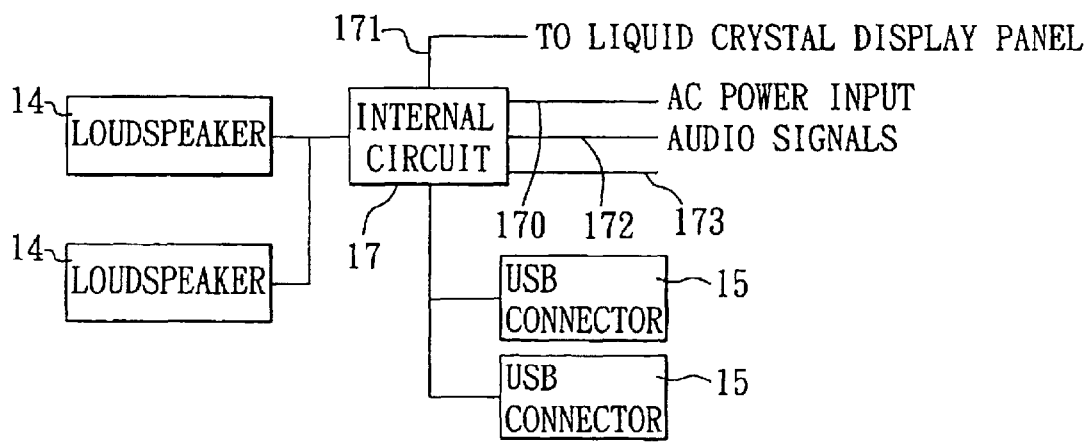
FIG. 8 is a schematic circuit block diagram of the second preferred embodiment.

FIGS. 6 and 7 illustrate the second preferred embodiment of a liquid crystal display according to the present invention, which is a modification of the first preferred embodiment. Unlike the previous embodiment, the base 13' further has an internal circuit 17 mounted therein, a pair of loudspeakers 14 mounted therein and coupled electrically to the internal circuit 17, and two universal serial bus (USB) connectors 15 mounted thereon and coupled electrically to the internal circuit 17. Referring to FIG. 8, the internal circuit 17 has an input port 170 adapted to receive an AC power input from a power source (not shown) and an output port 171 coupled electrically to an input 110 of the liquid crystal display panel 11 via an external cable 18 (see FIG. 7). The internal circuit 17 is adapted to convert the AC power input from the input port 170 into a DC power input that is supplied to the liquid crystal display panel 11. The internal circuit 17 further has an audio signal input port 172 adapted to receive external audio signals from a computer (not shown). The internal circuit 17 enables the loudspeaker 14 to reproduce the external audio signals from the audio signal input port 172. The internal circuit 17 further has an input port 173 adapted to receive control signals from a computer (not shown). The internal circuit 17 is adapted to transmit the control signals from the input port 173 to peripheral equipment (not shown) connected to the USB connectors 15.

Figure 3:
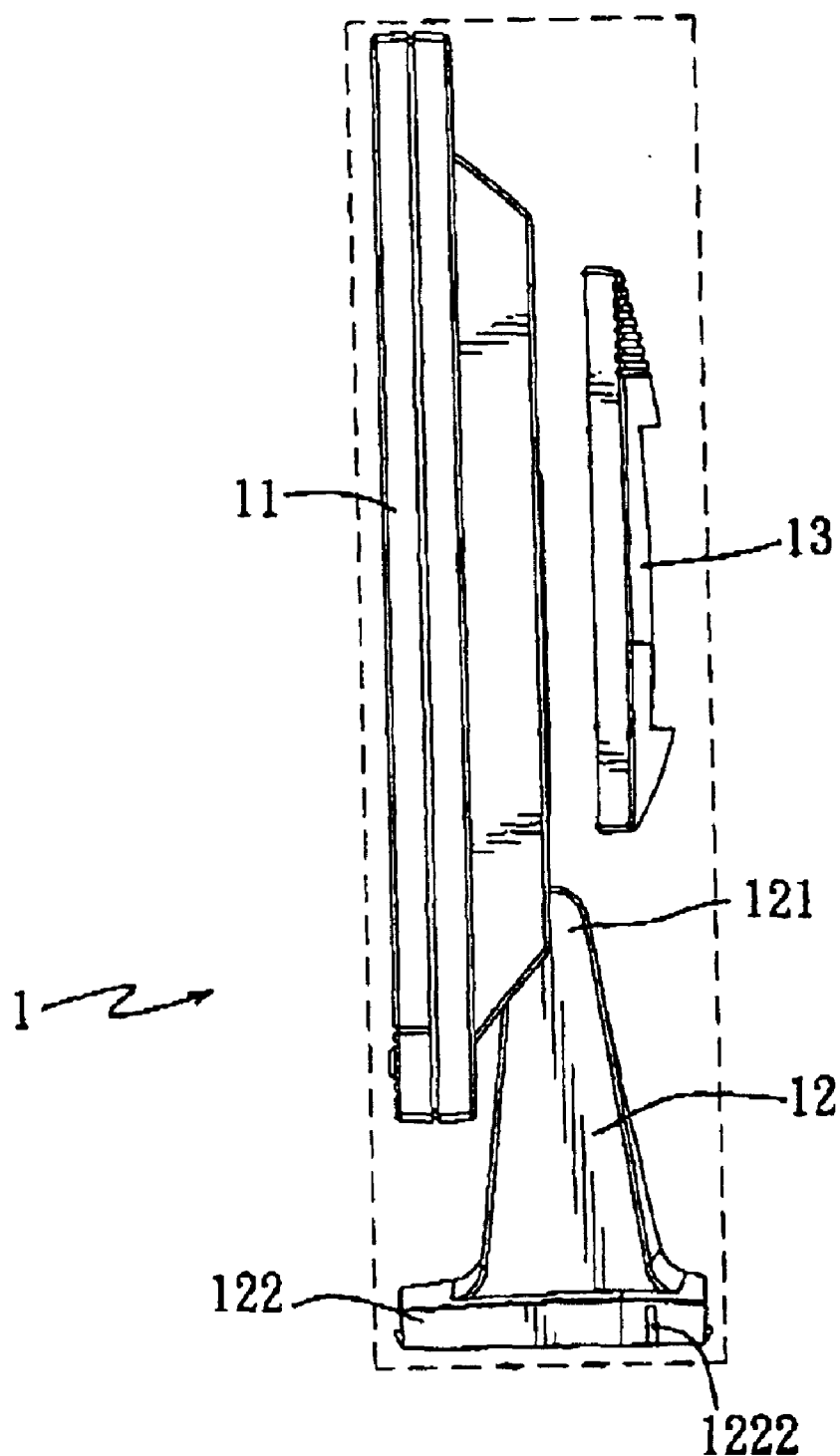
FIG. 3 is a schematic side view showing a packed state of the first preferred embodiment.
Figure 5:
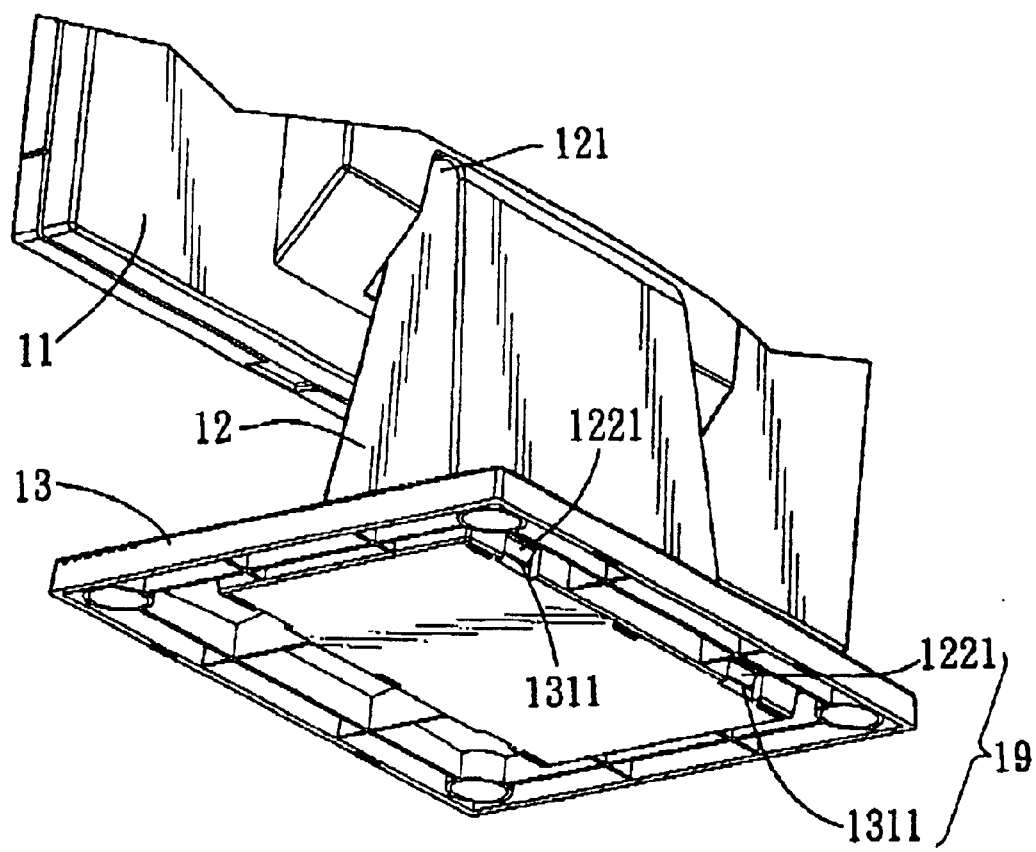
FIG. 5 is a fragmentary bottom perspective view showing the first preferred embodiment.

Due to the presence of the engaging unit 19 and the positioning unit, the assembly of the liquid crystal display panel 11 and the supporting portion 12 can be supported stably on the base 13. The base 13 can be easily detached from the supporting portion 12 by pressing the engaging lugs 1221 from a bottom side of the base 13 (see FIG. 5) to release the engagement between the engaging lugs 1221 and the engaging holes 1311. Therefore, after detaching the base 13 from the supporting portion 12, the liquid crystal display 1 of this invention can have a relatively small packaging size requirement (indicated by dotted lines in FIG. 3) to result in lower costs.

Moreover, although the size of the base 13 depends on that of the liquid crystal display panel 11, the supporting portion 12 can be designed to have a uniform size such that the supporting portion 12 can be applied to different sizes of liquid crystal display panels with different sizes. A lower mold expenditure is thus incurred as compared to the abovementioned conventional liquid crystal display.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A liquid crystal display comprising:
    a liquid crystal display panel;
    a supporting portion having a connecting end connected non-removably to the liquid crystal display panel, and an engaging end opposite to the connecting end;
    a base connected detachably to the engaging end of the supporting portion; and
    an engaging unit disposed on the engaging end of the supporting portion and the base for providing a releasable engagement between the supporting portion and the base, wherein the base has a top surface formed with a receiving recess for receiving the engaging end of the supporting portion therein, and
    wherein the engaging unit includes a resilient engaging lug formed on the engaging end of the supporting portion, and an engaging hole formed in the receiving recess of the base, the engaging lug being capable of engaging the engaging hole when the engaging end of the supporting portion is disposed in the receiving recess of the base so as to rigidly support the supporting portion with the base.

2. The liquid crystal display as claimed in claim 1, further comprising a positioning unit disposed on the engaging end of the supporting portion and the base for positioning the engaging end in the receiving recess.

3. The liquid crystal display as claimed in claim 2, wherein the positioning unit includes a vertically extending positioning groove formed in the engaging end of the supporting portion, and a vertically extending positioning rib formed in the receiving recess, the positioning rib being capable of engaging the positioning groove when the engaging end of the supporting portion is disposed in the receiving recess of the base.

4. The liquid crystal display as claimed in claim 1, wherein said base has an internal circuit mounted therein.

5. The liquid crystal display as claimed in claim 4, wherein said internal circuit has an input port adapted to receive an AC power input, and an output port to be coupled to said liquid crystal display panel, said internal circuit being adapted to convert the AC power input from said input port into a DC power input to be supplied to said liquid crystal display panel.

6. The liquid crystal display as claimed in claim 4, wherein said internal circuit has an audio signal input port adapted to receive an external audio signal, said base further having a loudspeaker coupled electrically to said internal circuit, said internal circuit enabling said loudspeaker to reproduce the external audio signal from said audio signal input port.

7. The liquid crystal display as claimed in claim 4, wherein said internal circuit has an input port adapted to receive a control signal, said base further having a USB connector mounted thereon and coupled electrically to said internal circuit, said internal circuit being adapted to transmit the control signal to said USB connector.

* * * * *